(12) United States Patent
Kasten et al.

(10) Patent No.: US 8,732,719 B2
(45) Date of Patent: May 20, 2014

(54) METHOD AND SYSTEM FOR MANAGING RESOURCE CONNECTIONS

(71) Applicant: eBay Inc., San Jose, CA (US)

(72) Inventors: Christopher J. Kasten, Rancho Cordova, CA (US); Igor Chernyshev, Campbell, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/854,667

(22) Filed: Apr. 1, 2013

(65) Prior Publication Data

US 2013/0219403 A1 Aug. 22, 2013

Related U.S. Application Data

(63) Continuation of application No. 12/098,620, filed on Apr. 7, 2008, now Pat. No. 8,413,156.

(60) Provisional application No. 60/910,289, filed on Apr. 5, 2007.

(51) Int. Cl.
*G06F 13/00* (2006.01)
*G06F 15/16* (2006.01)
*H04L 12/26* (2006.01)

(52) U.S. Cl.
CPC ............... *H04L 43/00* (2013.01); *H04L 43/16* (2013.01)
USPC .......................................... 718/104; 709/227

(58) Field of Classification Search
None
See application file for complete search history.

(56) References Cited

U.S. PATENT DOCUMENTS

| 5,933,425 | A  | 8/1999  | Iwata |
| 6,058,389 | A  | 5/2000  | Chandra et al. |
| 6,108,307 | A  | 8/2000  | McConnell et al. |
| 6,160,875 | A  | 12/2000 | Park et al. |
| 6,262,989 | B1* | 7/2001  | Gemar et al. ............... 370/412 |
| 6,532,213 | B1 | 3/2003  | Chiussi et al. |
| 6,560,717 | B1 | 5/2003  | Scott et al. |
| 6,603,738 | B1* | 8/2003  | Kari et al. ................. 370/230.1 |

(Continued)

OTHER PUBLICATIONS

"U.S. Appl. No. 12/098,620, Final Office Action mailed Nov. 10, 2011", 20 pgs.

(Continued)

*Primary Examiner* — Eric Coleman
(74) *Attorney, Agent, or Firm* — Schwegman Lundberg & Woessner, P.A.

(57) ABSTRACT

Methods and system for managing resource connections are described. In one embodiment, an initial user request to access data stored at a resource is received. The initial user request is generated by an application of a plurality of applications having access to the resource. An existing connection from the application is utilized to provide the data to the application. A current user request to access data stored at the resource is received. Based on a determination that the existing connection is unavailable, the current user request is assigned to a waiter queue. A number of requests assigned to the waiter queue during a pre-defined time period is determined to exceed a threshold. A new connection from the application to the resource is created based on the availability of a further connection to the resource and the exceeding of the threshold.

20 Claims, 12 Drawing Sheets

(56) References Cited

U.S. PATENT DOCUMENTS

| | | | |
|---|---|---|---|
| 6,836,785 B1 * | 12/2004 | Bakshi et al. | 709/203 |
| 6,976,074 B2 | 12/2005 | Cabrera et al. | |
| 7,088,677 B1 * | 8/2006 | Burst, Jr. | 370/229 |
| 7,676,570 B2 | 3/2010 | Levy et al. | |
| 7,702,366 B2 * | 4/2010 | Suzuki et al. | 455/561 |
| 7,738,900 B1 | 6/2010 | Manroa et al. | |
| 7,839,787 B2 * | 11/2010 | Dispensa | 370/235 |
| 7,961,736 B2 | 6/2011 | Ayyagari | |
| RE43,645 E * | 9/2012 | Suni | 370/230 |
| 8,413,156 B2 | 4/2013 | Kasten et al. | |
| 2002/0099818 A1 | 7/2002 | Russell et al. | |
| 2002/0172199 A1 | 11/2002 | Scott et al. | |
| 2003/0088690 A1 | 5/2003 | Zuckerman et al. | |
| 2005/0220097 A1 * | 10/2005 | Swami et al. | 370/389 |
| 2006/0072735 A1 | 4/2006 | Shell et al. | |
| 2007/0070886 A1 | 3/2007 | Zirin | |
| 2008/0250419 A1 | 10/2008 | Kasten et al. | |

OTHER PUBLICATIONS

"U.S. Appl. No. 12/098,620, Non Final Office Action mailed Jun. 16, 2011", 18 pgs.

"U.S. Appl. No. 12/098,620, Notice of Allowance mailed Dec. 10, 2012", 8 pgs.

"U.S. Appl. No. 12/098,620, Response filed Mar. 12, 2012 to Final Office Action mailed Nov. 10, 2011", 11 pgs.

"U.S. Appl. No. 12/098,620, Response filed Aug. 26, 2011 to Non Final Office Action mailed Jun. 16, 2011", 11 pgs.

* cited by examiner

METHOD AND SYSTEM FOR MANAGING RESOURCE CONNECTIONS

CROSS-REFERENCE TO A RELATED APPLICATION

This application is a continuation of U.S. application Ser. No. 12/098,620 filed Apr. 7, 2008, issued as U.S. Pat. No. 8,413,156 on Apr. 2, 2013, and claims the benefit of U.S. Provisional Patent Application entitled "Managing Client Database Connections", Ser. No. 60/910,289, filed 5 Apr. 2007, which applications are incorporated in their entirety herein by reference.

BACKGROUND

As the number of the Web-based services and applications expands, so grows the demands placed upon the network and database equipment supporting such services and applications. Customers or consumers generally interact with a web site through an application which is connected to a database, or databases, to perform functions supported by a particular Web-based application and service. On a large scale, a multitude of applications may create a large number of connections to a particular database. However, the database system may become unstable when hit with a connection storm, where the database system cannot handle the rate of connection/disconnection requests. For example, a connection storm may occur when a large amount of new connections or disconnections to the database are concurrently requested from a multitude of applications.

BRIEF DESCRIPTION OF THE DRAWINGS

Some embodiments are illustrated by way of example and not limitation in the figures of the accompanying drawings in which.

DETAILED DESCRIPTION

Example methods and systems for managing resource connections are described. In the following description, for purposes of explanation, numerous specific details are set forth in order to provide a thorough understanding of example embodiments. It will be evident, however, to one skilled in the art that the present invention may be practiced without these specific details.

In an example embodiment, a user request associated with a centralized resource may be received. Availability of a connection to the centralized resource may be determined. A stagger delay for connection creation may be determined. The stagger delay may define a delay for creation of a new connection. The new connection to the centralized resource may be created based on the determining of whether the connection to the centralized resource is available and the stagger delay. The new connection may be utilized to process the user request.

Figure 1:
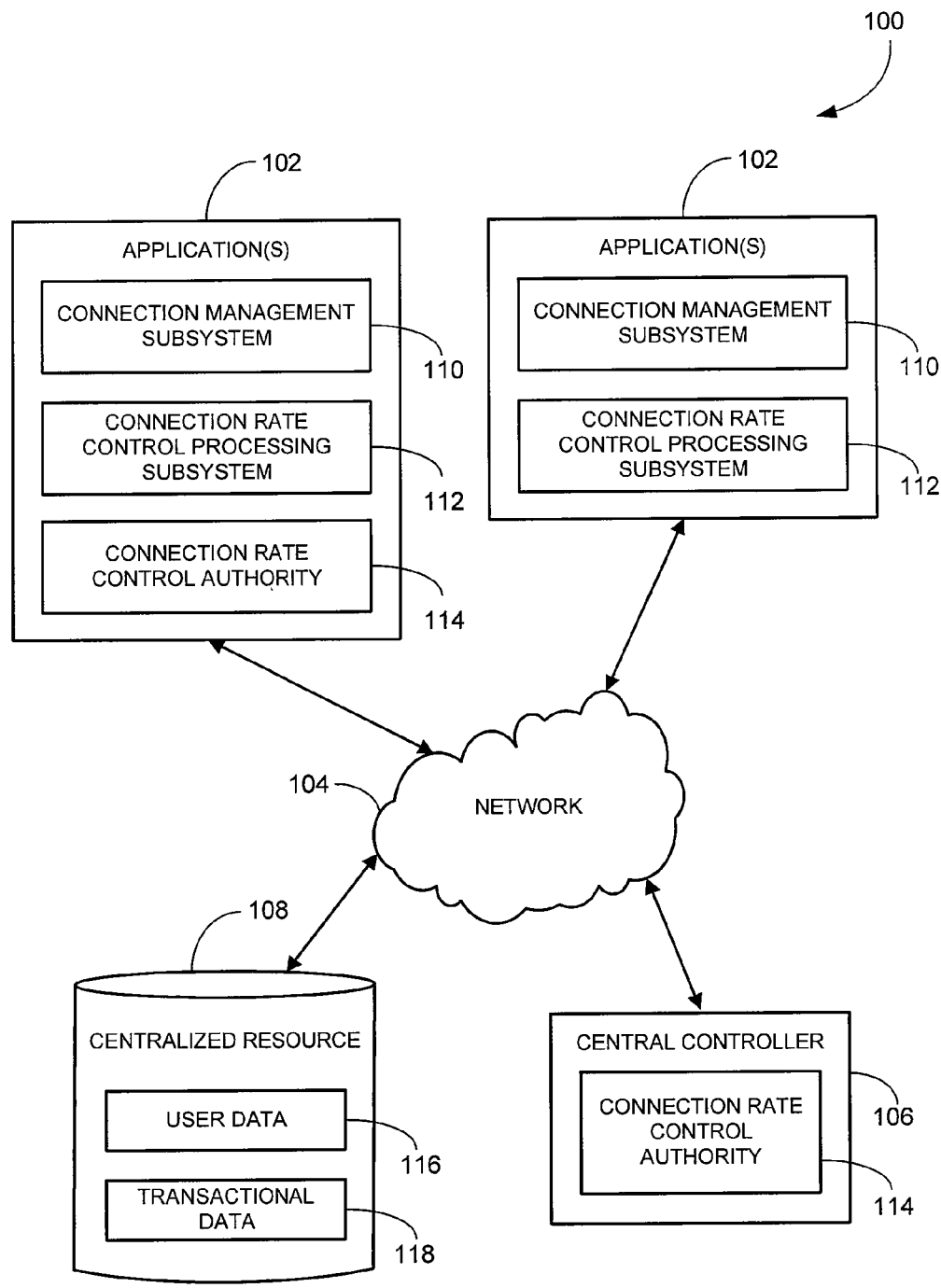
FIG. 1 is a block diagram of a system, according to example embodiments.

FIG. 1 illustrates an example system 100 with connections between one or more applications 102, a central controller 106, and a centralized resource 108. Multiple applications 102 may be communicatively coupled with the centralized resource 108 over a network 104 or may be otherwise communicatively coupled.

The multiple applications 102 may be operating on a single device or multiple devices. The number of requests received by a particular application of the applications 102 may be relatively constant. The received number of requests may not spike because of a network factor, but may spike because of another factor (e.g., a promotion associated with a particular application causing additional traffic and requests for data). In an example embodiment, the applications 102 may not have collective knowledge of what the other applications 102 are doing. The applications 102 may demonstrate a global behavior to prevent overloading the centralized resource 108 with requests for new connections due to this spike.

The network 104 over which the applications 102 and the central controller 106 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The multiple applications 102 may seek to access information stored within the centralized resource 108. The information may include, by way of example, user data 116 and/or transactional data 118. However, other information may be included within the centralized resource 108.

In one embodiment, the applications 102 operate and connect to the centralized resource 108 independently of each other. The applications 102 may communicate with the centralized resource 108 via a communications socket (not shown), such as a TCP socket, using a standard or custom communication protocol. The centralized resource 108 may receive requests from the applications 102 that have originated from the users. The applications 102 may connect to the centralized resource 108 using pre-existing connections released from prior requests or create new connections provided the resources are available.

A component of the system 100 may cause an increase in the response time of a request from the multiple applications 102 to the centralized resource 108. The increase in response time in combination with the continuing end-user traffic may cause a surge or high rate of actual and attempted new connections to the centralized resource 108 to occur from the multiple applications 102 to the centralized resource 108. For example, a database server slow down, or some other system component, such as the network 104, may experience a slowdown in network traffic causing a surge of new connections from the multiple applications 102 to the centralized resource 108 to try and meet the demand of the continued incoming rate of user requests as existing connections to the centralized resource 108 are not available for reuse due to slower response times. The surge of new connections may be referred to as a connection storm.

This connection storm may be the result of threads in the multiple applications 102 trying to process user requests and attempting to obtain a connection from a connection pool. However, there may be no connections available because the existing connections in the connection pool are still being used by other request threads. The other request threads may be holding the connections longer because of the increase in response time from the centralized resource 108 request. Since the threads are unable to obtain an existing connection from the connection pool, traditional connection pool implementations typically immediately create new connections for the threads to use, up to a maximum connection pool size.

However, the rate at which the connection pool allows the creation of the connections is uncontrolled and thus a connection storm may occur. The centralized resource 108 may become slower from the large rate of demand for connections. For example, a glitch may cause a spike in the number of new connections between the multiple applications 102 and the centralized resource 108. A bottleneck could occur at the centralized resource 108 when access to the centralized resource 108 slows down, the network 104 slows down, or another situation occurs in which the response time back from the centralized resource 108 slows down. A number of new connection requests may then be made (e.g., a connection storm) which, if uncontrolled, could overload the centralized resource 108.

A connection management subsystem 110 may be in communication with a connection rate control processing subsystem 112 and a connection rate control authority 114 to squeeze end user traffic into an existing set of connections and slowly increase the number of connections. The subsystems 112, 114 and the connection rate control authority 114 may be used to manage connections to the centralized resource 108 to prevent the overload of the centralized resource 108 from occurring, limit the effects of a connection storm, or otherwise enable more fluid communication with the centralized resource 108. For example, the connection rate control processing subsystem 112 may be in communication with the connection rate control authority 114 to stagger and/or throttle the rate of connection requests to enable the centralized resource 108 to operate with ordinary or some acceptable level of degraded performance of ordinary functions. In an example embodiment, the connection rate control processing subsystem 112 may be in communication with the connection rate control authority 114 to prevent the opening of a number of connections simultaneously or in a large spike In one embodiment, to avoid a connection storm, the connection rate control processing subsystem 112 may be in communication with the connection rate control authority 114 to stagger and/or throttle new connection creation or destruction. Staggering may include delaying the creation or destruction of a connection an amount of time using an algorithm that effectively evenly distributes the new connection requests over an interval of time across the applications 102. The use of staggering may result in a lower rate of new connection requests over a period of time to the centralized resource 108, which allows the centralized resource 108 the ability to keep up with these requests and not become overloaded and degrade in performance or become unresponsive. The determination of the stagger delay time may be a random number generator choosing a stagger delay time from a specified range of time, so that the applications 102 may independently randomly distribute their new connection requests over a specified time interval (e.g., a stagger interval). In one embodiment, this results in a more distributed and lower connection rate to the centralized resource 108.

Throttling includes delaying the creation or destruction of a subsequent connection an amount of time that is determined or is a fixed amount of time after the last creation or destruction of a another connection such that subsequent creations or destructions after the stagger, which occurs after the throttle time, do not create a delayed connection storm. Therefore the stagger and throttle features may prevent connection storms by distributing the creation or destruction of connections over an interval of time to distribute and lower the rate of connection creation or destruction, while sustaining this pattern of even distribution continuously over intervals of time from the throttle mechanism. In some embodiments, the throttle interval may be equal to the stagger interval, so that a subsequent connection request cannot occur within the same stagger interval for an application 102 and causes spikes. In various embodiments, this may cause some of the threads requesting a connection from the connection pool to timeout waiting for a connection from the connection pool, as the creation of a new connection may be delayed due to stagger or throttle and the request may timeout waiting for this new connection or another connection to be returned to the connection pool. In one embodiment, however, the wait timeout may be set at a threshold significantly above the typical response time such that a thread will likely obtain a returned connection while the connection pool is staggering or throttling and delaying the creation of a new connection.

Additionally, if a thread that creates the new connections cannot create a new connection because of an error in creating the connection (e.g., a network error, database error, etc.) the thread will try to create the connection again. However, too many retries may also create a retry connection storm. In one embodiment, the connection rate control processing subsystem 112 may be in communication with the connection rate control authority 114 to throttle retries by waiting an amount of time (e.g., throttle interval value) between retries. The connection applications may also limit the number of retries before initiating a "markdown" procedure, where all requests to the centralized resource 108 are blocked in the applications 102 from continuing to hit the centralized resource 108. In another embodiment, successful retries may also be throttled to prevent too many successive new connections on a retry.

In various embodiments, the connection rate control processing subsystem 112 may be in communication with the connection rate control authority 114 to cause the connection pool to behave in one or more of the following ways:
  if a request can be satisfied with a free existing connection, that free existing connection will be used;
  if the request cannot be satisfied with a free existing connection, a connection request will be counted and caller thread will be placed onto the waiter queue; in one embodiment it may timeout from the waiter queue in one second; in one embodiment, if the number of waiter queue timeouts in a period of time exceeds a threshold, this may be used to trigger the action to try and create a new connection within a background thread and add it to the connection pool;

if a data source is in "warm up mode", which in one embodiment may be defined by a specific time interval after the first connection request is made to a connection pool, then during this warm up period of time it will allow new connections to be created immediately based on demand and without any staggering or throttling, so that the applications 102 can quickly and efficiently initialize without encountering timeouts which may cause startup failure;

if there are zero connections in the pool and it is not due to a connection flush on an error, a new connection may be created by a background thread;

the pool may also attempt to create a new connection if it has reached the stagger/throttle delay with a significant rate of connection requests over a time period that had to wait some amount of time on the waiter queue;

once a connection is created or a decision is made that connection request rate is not high enough, the staggering/throttling cycle is reset;

throttling time may be measured from the first connection attempt after connection creation; staggering starts after end of warm-up or after staggering/throttling time is reset; throttling time may be configurable and configured per data source (e.g., one minute) and staggering delay may be a generated value such as a generated random time value with a range defined by a stagger interval (eg between zero and throttling time); and warm-up time may be configurable and, in one embodiment, is set globally to a predefined number of minutes, which begins after the first connection attempt after server initialization has been completed, or a connection pool flush or an explicit throttle reset command.

In one embodiment, the stagger delay is generated by a random number generator when each application 102 initializes. This may occur at the startup of the connection pool and may only change upon a restart. In another embodiment, the random number generator generates a random number for the stagger delay each time it creates a connection. However, many scenarios may exist for when and how a threshold value (e.g., a random number) is generated and assigned to the applications 102 without departing from the spirit of the methodologies discussed herein.

In one embodiment, the rate at which connections are destroyed to the centralized resource 108 is controlled by combination of the connection rate control processing subsystem 112 and the connection rate control authority 114. For example, if there are multiple socket related errors where the connections are no longer functional, a disconnection storm may cause the system to become unstable if disconnection rate is not controlled. The same approach and methods described with respect to staggering and throttling connection creation rates at each application 102 may be applied here with controlling disconnection rates. In another embodiment, the method for controlling disconnection rates only uses the staggering process and does not implement a throttling process.

In one embodiment, retries, as described above, may be implemented in the markdown logic. The markdown logic may include the following features to implement retry management: counting connect failures separately (e.g., counting the number of background connect errors), markdown on connect occurring after four consecutive (configurable) failed attempts, and success on use does not move data source to good state if there were background connect failures.

In many cases a markdown may occur across a large number of machines (e.g., applications 102). This type of markdown may cause a disconnection storm, slowing down the centralized resource 108 and causing a connection storm from other applications 102. In one embodiment, to avoid this scenario, a markdown may not flush connection pool immediately and once a data source is marked down (either automatically or manually), connection pool flush may happen at a random time between one and some configurable number of minutes after a markdown event.

In one embodiment, if markup happens before the connection pool is drained, the pool may be immediately flushed. A markup may not be broadcast too fast across a multitude of machines, otherwise the fast markup across the multitude of machines may create an increased number of new connection attempts. A connection pool flush or drain may drop all the connections to the centralized resource 108, which was marked down.

When a stale connection error happens on some resource connections, all connections to the centralized resource 108 may be automatically dropped. However, the dropping may create disconnection storms and subsequent connection storms with the centralized resource 108 when a large group of applications 102 is involved. In one embodiment, to avoid this issue, a data source may be configured to flush connections one-by-one (e.g., to flush only offending connections). In various embodiments, the connection flushing may be implemented automatically using connection staggering/throttling as described herein, or enabled manually by manipulating the data source directly.

In one embodiment, connections are created and added to the connection pool by a background thread and not the requesting thread. Background connection creation allows requester threads to receive better quality of service by providing accurate timeouts, FIFO (first-in-first-out) semantics of the waiting queue, and by simplifying the logic of connection retries. In one embodiment, if a free connection is not available from the connection pool, then the connection pool logic may make a decision on whether a new connection is required. If new connection is required, then the connection pool may post a unit of work to a queue attached to a background connection creation thread, effectively requesting the thread create a new connection and perform retries as necessary on its behalf. In one embodiment, the use of the background threads for connection creation may necessitate significant changes in the way connection management system organizes "waits" for free connections to become available. If the number of concurrently waiting threads becomes higher than certain threshold (e.g., configured maximum number of pooled connections), the last threads in the wait line may wait until the normal (usually very short) timeout occurs. Those threads in the queue that are closer to receiving a free connection (position in the queue below threshold) can potentially be given more time to wait. This change effectively reflects that some connection management subsystems 110 may allow any threads below that threshold to open new connections to the centralized resource 108, making them slower. The wait period for such threads may be further extended when a concurrent background connection request has not yet completed.

In one embodiment, there is the notion of connection "allowances" and a "critical processes." When new connection creation is delayed due to staggering or throttling, connection availability within the same connection pool becomes a critical issue, because the current rate of the demand may become higher than the currently allocated capacity. If logic that is unexpected, unusual, irregular, or infrequent requests a connection from the connection pool, it may reduce the capacity of the connection pool until the current throttling period expires. This may artificially lower the capacity of the connection pool to serve the regular flow of requests and this issue may become worse if this type of request uses a connection for a long time making it unavailable to other threads of the application.

An example of this type of request is automated refreshing of the data in a cache in the applications 102 by a background thread, which may occur at some infrequent interval and may obtain a large amount of data from the centralized resource 108 and thus hold the connection for a long amount of time. This situation may cause transient timeouts waiting for a connection by the regular request threads or by one of these critical background thread processes. In one embodiment, this issue may be resolved by the introduction of "allowances" and "critical processes." When an unusual and slow process requests a connection, it may mark itself as a "critical process" and provide an "allowance" for the creation of a new connection in the connection pool. Being marked as a "critical process," this thread of execution may be the first one in the wait queue to obtain a free connection. The "allowances" allows the connection pool to create a new connection immediately (if demand is high) without waiting for throttling or potentially staggering period to end. In various embodiments, this effectively allows rare, slow and unexpected process to mark themselves and create allowances for new connections if needed by other threads.

Connections for the applications 102 may be provided through a connection pooling implementation. The connection pooling may provide control over the flushing of the connection pool, monitoring/statistics for the connection pool, control and monitoring of query statement caches, control over pool actions when exceptions are received from the centralized resource driver, and the ability to add advanced features like dynamic setting of pool configuration parameters during runtime without requiring application restarts and flushing of individual connections or cached statements in the connection pool. The connection pooling may be implemented in a general pluggable driver manner, so that different database or other type of drivers may be used with the connection pooling mechanisms.

In an example embodiment when the connection pool size is zero, a determination may be made as to whether timeout or network errors occurred during a time period. If timeout or network errors occurred, no new connections may be created. However, if no timeout or network errors occurred, new connections may be created without staggering or throttling for a pool with zero connections.

The application threads associated with the user requests made by the applications 102 may be placed on the waiter queue. A background thread associated with the connection rate control authority 114 may be in control of which application threads on the waiter queue will receive a new connection and when they will receive the new connection.

When the connection rate control processing subsystem 112 is in communication with the connection rate control authority 114, a determination may be made to permit another connection to be created and add to the connection pool because there are waiters in the waiter queue. The requests may be staggered over a stagger interval. A random or pseudo-random number may be selected from within a configured stagger interval (e.g., between zero and sixty), and the number may reflect an amount of time before an attempt is made to create the new connection. While the applications 102 may not be in communication with one another, the applications 102 may each attempt to create a new connection or request creation of a new connection based on the stagger interval so that the centralized resource 108 is not connection stormed.

In one embodiment, the rate at which connections are created or destroyed to the centralized resource 108 may be controlled by the connection rate control authority 114 in the central controller 106. The application 102 may not use a co-resident connection rate control authority 114 in the application 102, but rather may delegate this function to a centralized connection rate control authority 114 in a central controller 106.

Figure 2:
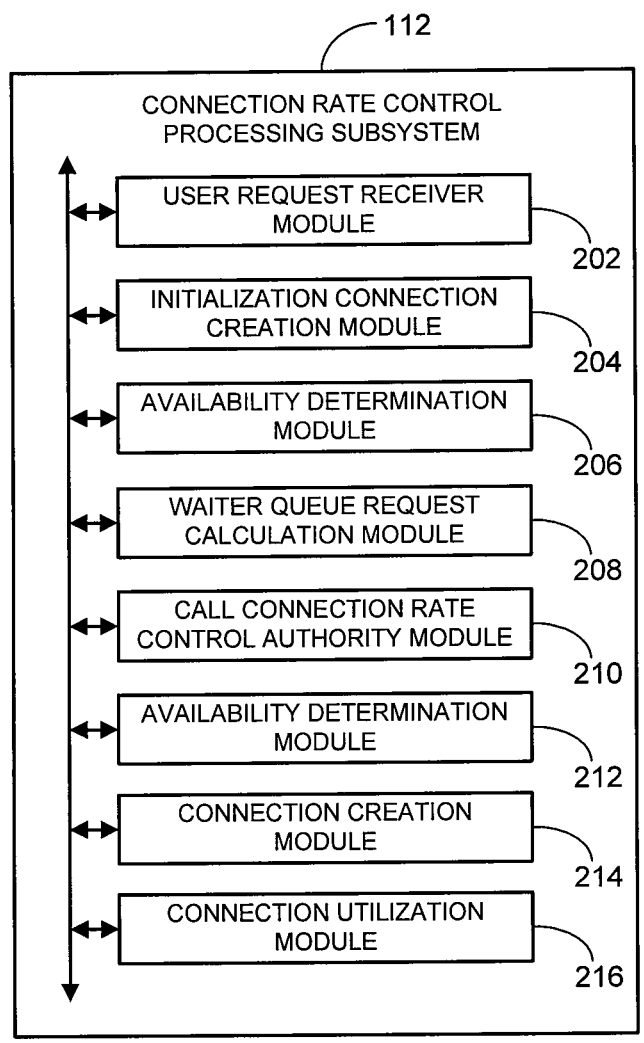
FIG. 2 is a block diagram of an example connection rate control processing subsystem that may be deployed within the system of FIG. 1 according to an example embodiment.

FIG. 2 illustrates an example connection rate control processing subsystem 112 (see FIG. 1) that may be deployed in the applications 102 of the system 100 or otherwise deployed in another system. The connection rate control processing system 112 may include a user request receiver module 202, an initialization connection creation module 204, an availability determination module 206, a waiter queue request calculation module 208, a call connection rate control authority module 210, an availability determination module 212, a connection creation module 214, and/or a connection utilization module 216. Other modules may also be included.

The user request receiver module 202 receives one or more user requests associated with the centralized resource 108. The user requests received by the user request receiver module 202 may include initial user requests and/or an additional user requests.

The initialization connection creation module 204 creates a number of initial connections until a steady state is achieved. The number of initial connections created may be based on a number of initial user requests received. The initial connections may be created to enable utilization of an initial user request.

The availability determination module 206 determines availability of a connection and/or an existing connection to the centralized resource 108.

The waiter queue request calculation module 208 calculates a number of connection requests that waited some amount of time on a waiter queue over a time period. The calculated information may be used, in one embodiment, to determine whether a significant amount of connection requests is waiting to receive a connection. If the calculated number of waiter queue connection requests reaches a threshold, then a new connection may be requested from a background thread to provide a connection pool with more capacity. The number of requests waiting for a connection may also reduce below the threshold of significant waiters.

The call connection rate control authority module 210 can either call the co-resident connection rate control authority 114 in the application 102 or the centralized connection rate control authority 114 in the central controller 106 to receive permission to create a new connection. The application 102 may be configured to use either the co-resident connection rate control authority 114 in the application 102 or the connection rate control authority 114 in the central controller 106.

The availability determination module 212 determines availability of an existing connection to the centralized resource 108.

The connection creation module 214 creates the new connection and/or an additional new connection to the centralized resource 108. The creation of the new connection may be based on the determination of whether a connection to the centralized resource 108 is available, a determination of the delay type, and the stagger delay. The creation of the additional new connection may be based on the determination of availability, the determination of the last time and/or a throttle delay.

The connection utilization module 216 utilizes a new connection to process the user request and/or the additional user request based on the response of the connection rate control authority 114. The connection utilization module 216 utilizes an existing connection from a particular application 102 to the centralized resource 108.

Figure 3:
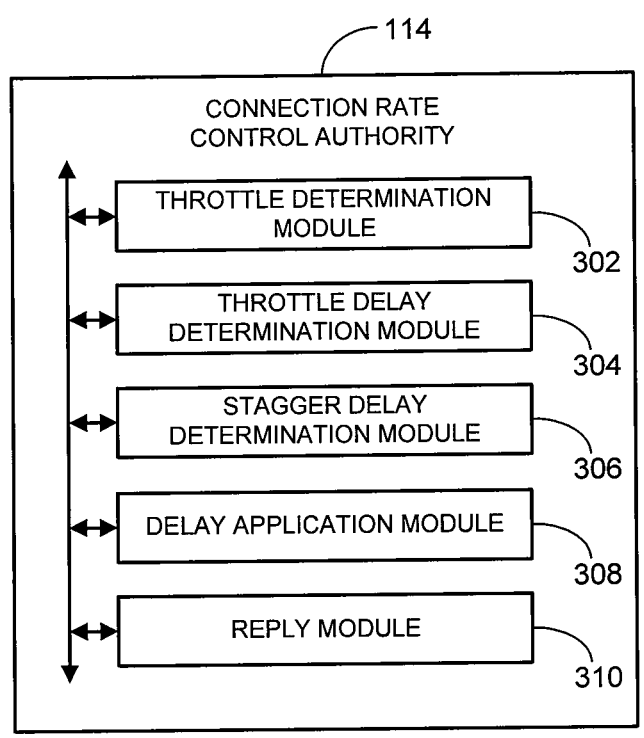
FIG. 3 is a block diagram of an example connection rate control authority subsystem that may be deployed within the system of FIG. 1 according to an example embodiment.

FIG. 3 illustrates an example connection rate control authority 114 (see FIG. 1) that may be deployed in the applications 102 and/or the central controller 106 of the system 100 or otherwise deployed in another system.

The connection rate control authority 114 may include a throttle determination module 302, a throttle delay determination module 304, a stagger delay determination module 306, a delay application module 308, and/or a reply module 310. Other modules may also be included.

The throttle determination module 302 determines whether to throttle. The throttle delay determination module 304 determines a throttle delay. The stagger delay determination module 306 determines a stagger delay.

The delay application module 308 that applies one or more delays. The reply module 310 sends a reply to the connection rate control processing subsystem to create a connection.

Figure 4:
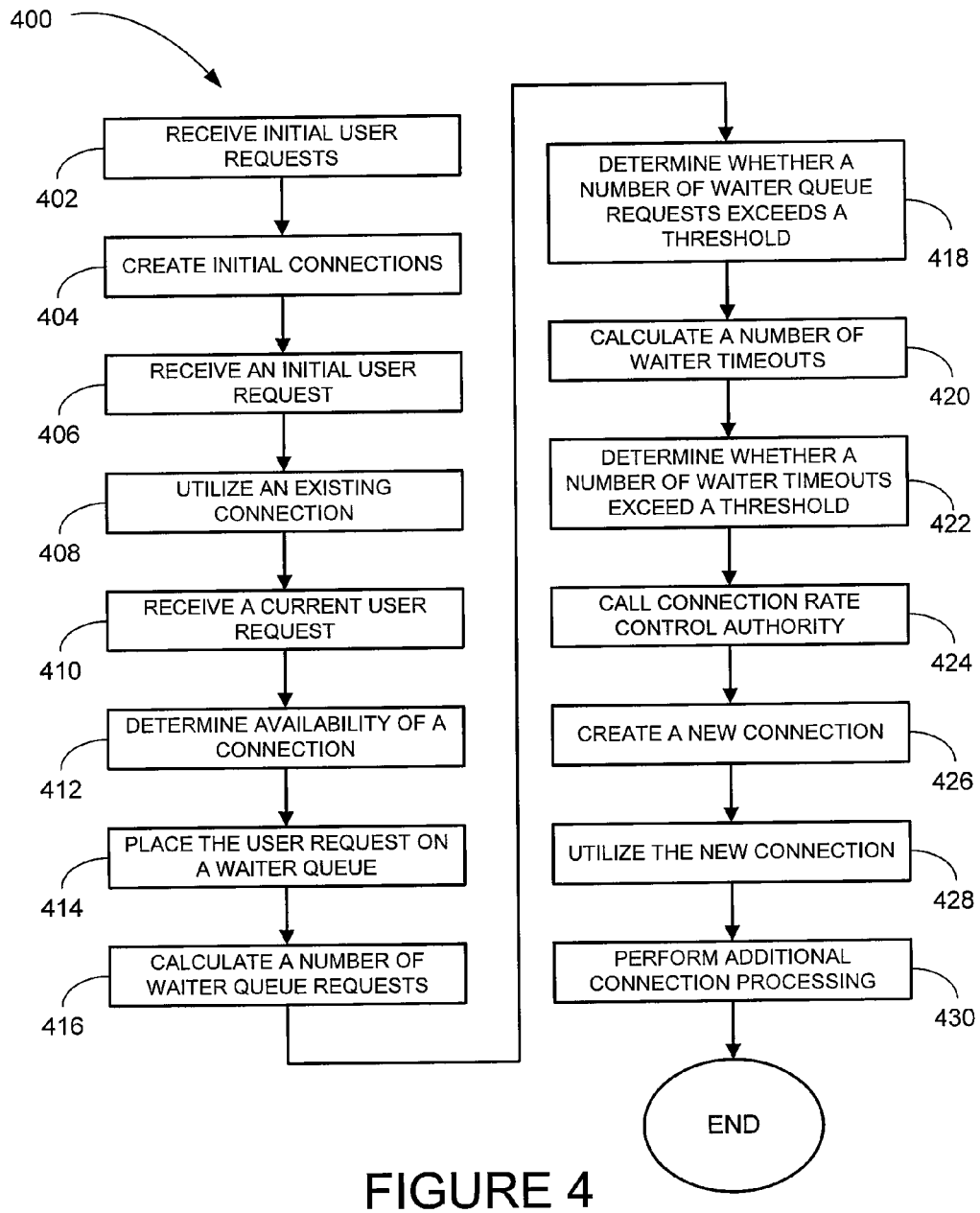
FIG. 4 is an example flowchart illustrating a method for connection utilization according to an example embodiment.

FIG. 4 illustrates a method 400 for connection utilization according to an example embodiment. The method 400 may be performed by the applications 102 of the system 100 (see FIG. 1) or otherwise performed. The method 400 may be performed on the application thread level or otherwise performed.

A number of initial user requests associated with the centralized resource 108 may be received at block 402. The initial user requests may be received serially, simultaneously, and/or otherwise received. The user requests may be a web request or a different type of user request. The web requests may include, by way of example, a search request for an item, a search request for a user, a search request for a location, a search request for a web page, or the like.

At block 404, a number of initial connections may be created based on the initial user requests received. An initial connection may be created to enable utilization of an initial user request. The initial connections may be created until a steady state is achieved. In an example embodiment, the operations performed at block 402 and block 404 may be used during a configured warm up period until a steady state is achieved.

An initial user request associated with the centralized resource 108 may be received at block 406.

An existing connection from a particular application 102 to the centralized resource 108 may be utilized at block 408. The existing connection may be from a thread returning a connection, from a background thread creating a new connection, putting the new connection in the connection pool, and then utilizing the connection from the connection pool, or may be otherwise utilized.

A user request (e.g., a current user request) associated with the centralized resource 108 is received at block 410.

Availability of a connection to the centralized resource 108 is determined at block 412. The availability of the connection to the centralized resource 108 may be determined from the connection pool of potentially available connections or may be otherwise determined.

The user request may be placed on the waiter queue at block 414.

A number of the requests placed on the waiter queue during a time period may be calculated at block 416. A determination of whether the number of requests placed on the waiter queue during a time period exceeds a threshold may be made at block 418.

A number of waiter timeouts may be calculated during a time period at block 420. A determination of whether the number of waiter timeouts exceeds a waiter timeout threshold may be made at block 422.

A call may be made to the connection rate control authority 114 at block 424.

At block 426, a new connection from the application 102 to the centralized resource 108 is created based on the availability of a connection to the centralized resource 108 and the response from the connection rate control authority 114.

The new connection is utilized to process the user request at block 428. Additional connection processing may be performed at block 430.

Figure 5:
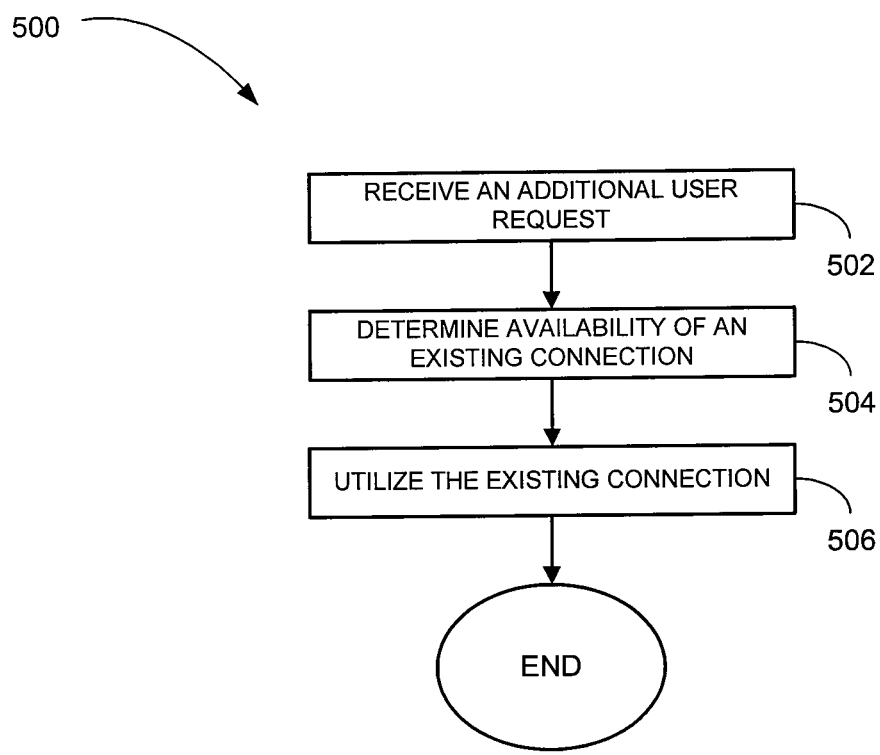
FIGS. 5 and 6 are example flowcharts illustrating a method for additional connection processing according to example embodiments.

FIG. 5 illustrates a method 500 for additional connection processing according to an example embodiment. The method 500 may be performed at block 430 (see FIG. 4) or otherwise performed. In an example embodiment, the method 500 may be performed at the end of a connection storm. However, the method 500 may otherwise be performed.

An additional user request associated with the centralized resource 108 is received at block 502. Availability of an existing connection to the centralized resource 108 may be determined at block 504. At block 506, the existing connection may be utilized to process the additional user request based on the determination of the availability.

Figure 6:
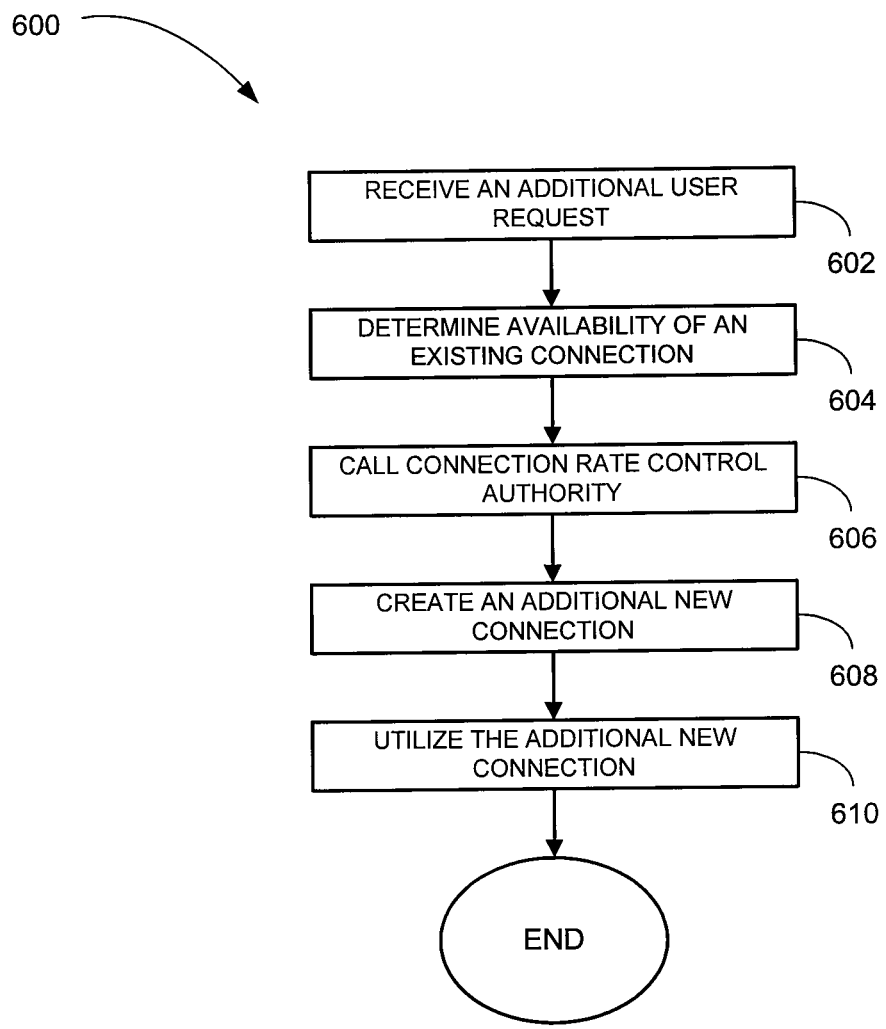

FIG. 6 illustrates a method 600 for additional connection processing according to an example embodiment. The method 600 may be performed at block 430 (see FIG. 4) or otherwise performed.

An additional user request associated with the centralized resource 108 may be received at block 602. The availability of an existing connection to the centralized resource 108 may be determined at block 604. A call to the connection rate control authority 114 may be made at block 606.

At block 608, an additional new connection may be created from the application 102 to the centralized resource 108 based on determination of the availability of an existing connection and the response from the connection rate control authority 114. The connection rate control authority 114 may make this determination based on a throttle delay. The throttle delay may be used to repeat a distributed pattern associated with the stagger delay during a connection storm to keep the user requests evenly distributed. The throttle delay may include a same amount of time as the stagger delay or a different amount of time. The additional new connection may be utilized at block 610.

For example, the operations may be performed at block 608 when another was recently created based on an assumption that other applications 102 have a similar demand.

Figure 7:
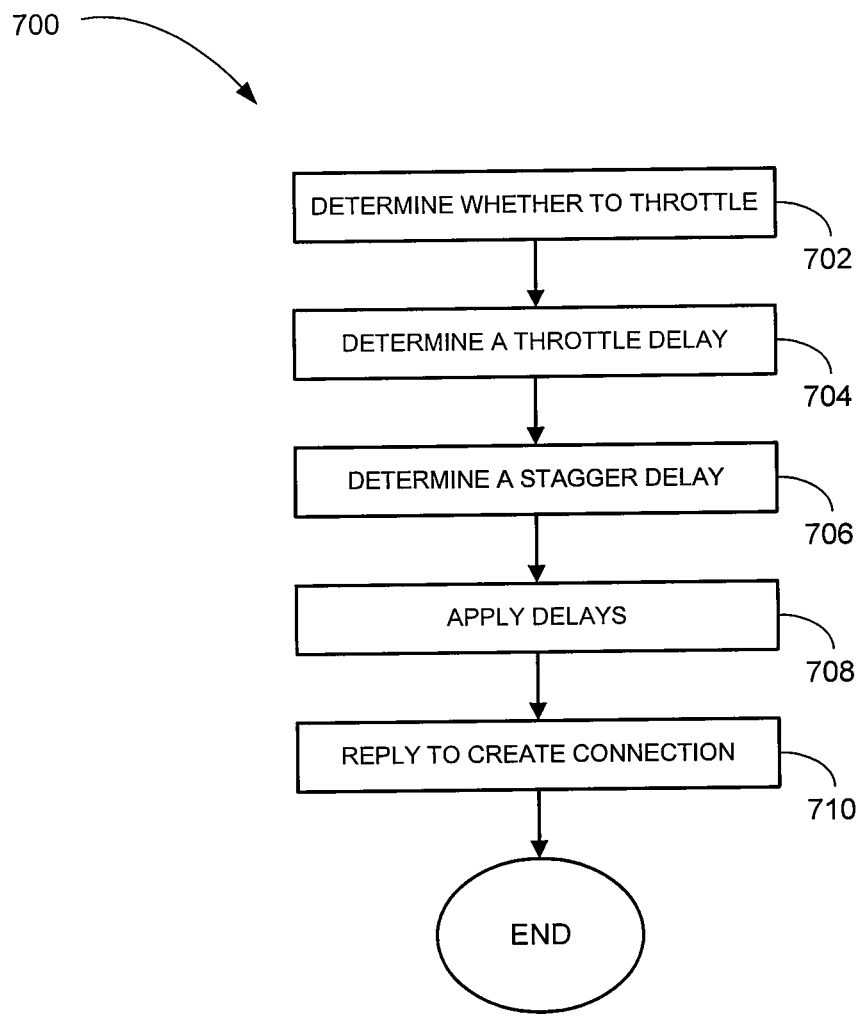
FIGS. 7 and 8 are example flowcharts illustrating a method for connection rate control authority processing according to example embodiments.

FIG. 7 illustrates a method 700 for connection rate control authority processing that may be performed by the applications 102 and/or the central controller 106 of the system 100 (see FIG. 1) or otherwise performed. The method 700 may be performed at block 424 (see FIG. 4) or at block 606 (see FIG. 6) or otherwise performed.

A determination to throttle may be made at block 702 based on a last new connection creation date. A throttle delay may be determined at block 704 based on a determination at block 702 that a throttle is needed. A stagger delay may be determined at block 706. One or more delays may be applied at block 708. A reply to a create connection may be sent at block 710.

Figure 8:
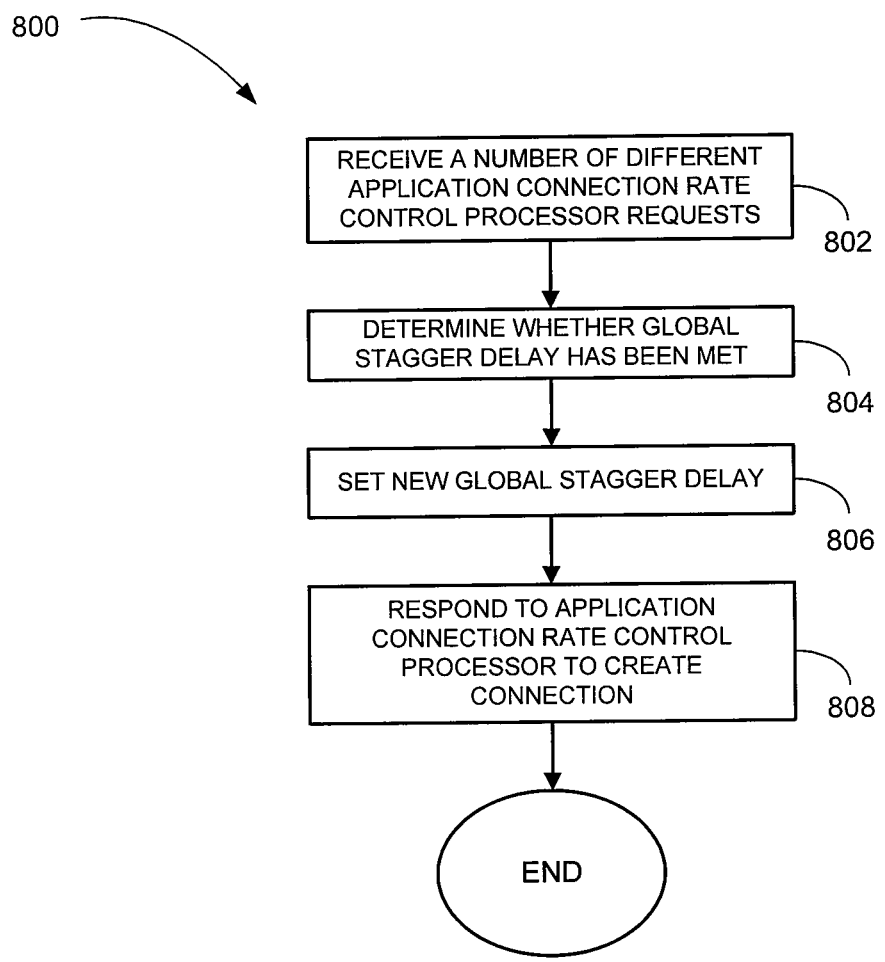

FIG. 8 illustrates a method 800 for connection rate control authority processing according to an example embodiment. The method 800 may be performed at block 424 (see FIG. 4) or at block 606 (see FIG. 6) by the central controller 106 or otherwise performed.

At block 802, a number of different application connection rate control process requests associated with the centralized resource 108 may be received.

A determination of whether a global stagger delay has been met may be made at block 804. A new global stagger delay may be set at block 806. A response to the connection rate control processing subsystem 112 to create connection may be made at block 808.

Figure 9:
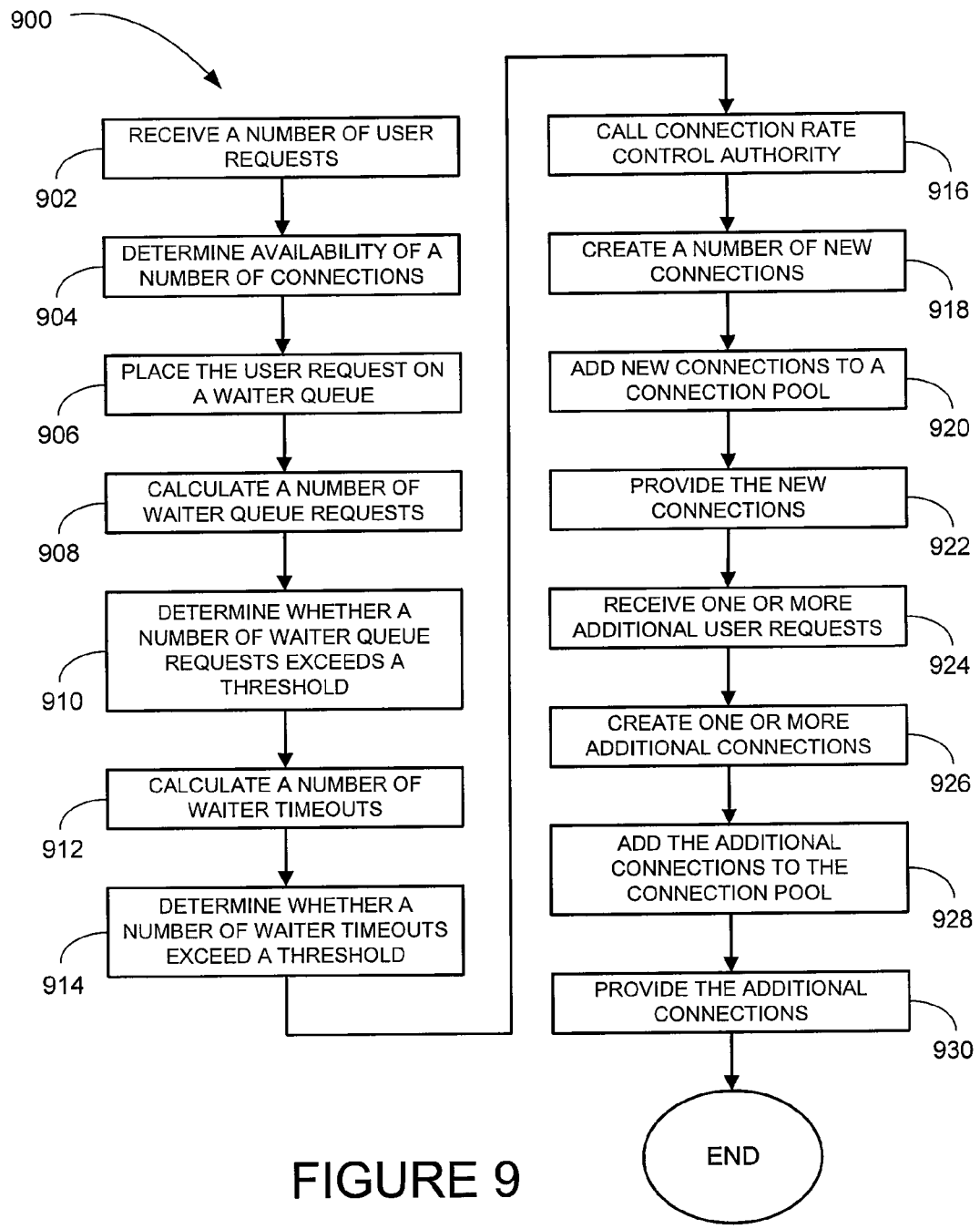
FIG. 9 is an example flowchart illustrating a method for connection utilization according to an example embodiment.

FIG. 9 illustrates a method 900 for connection utilization according to an example embodiment. The method 900 may be performed by the applications 102 (see FIG. 1) or otherwise performed. The method 900 may be performed on the application thread level or otherwise performed.

A number of user requests associated with the centralized resource 108 are received at block 902. The user requests may be from a single application 102 or multiple different applications 102.

Availability of a number of connections to the centralized resource 108 may be determined at block 904.

The user request may be placed on the waiter queue at block 906.

A number of the requests placed on the waiter queue during a time period may be calculated at block 908. A determination of whether the number of requests placed on the waiter queue during a time period exceeds a threshold may be made at block 910.

A number of waiter timeouts may be calculated during a time period at block 912. A determination of whether the number of waiter timeouts exceeds a waiter timeout threshold may be made at block 914.

A call may be made to the connection rate control authority 114 at block 916.

A number of new connections to the centralized resource 108 may be created based on the stagger interval at block 918. The new connections may be added to the connection pool at block 920. The new connections may be provided to one or more applications at block 922.

One or more additional user requests associated with the centralized resource 108 may be received at block 924.

One or more additional connections from a single application 102 or multiple different applications 102 to the centralized resource 108 may be created based on a throttle interval at block 926.

The additional connections may be added to the connection pool at block 928. The additional connections may be provided to the one or more applications at block 930.

Figure 10:
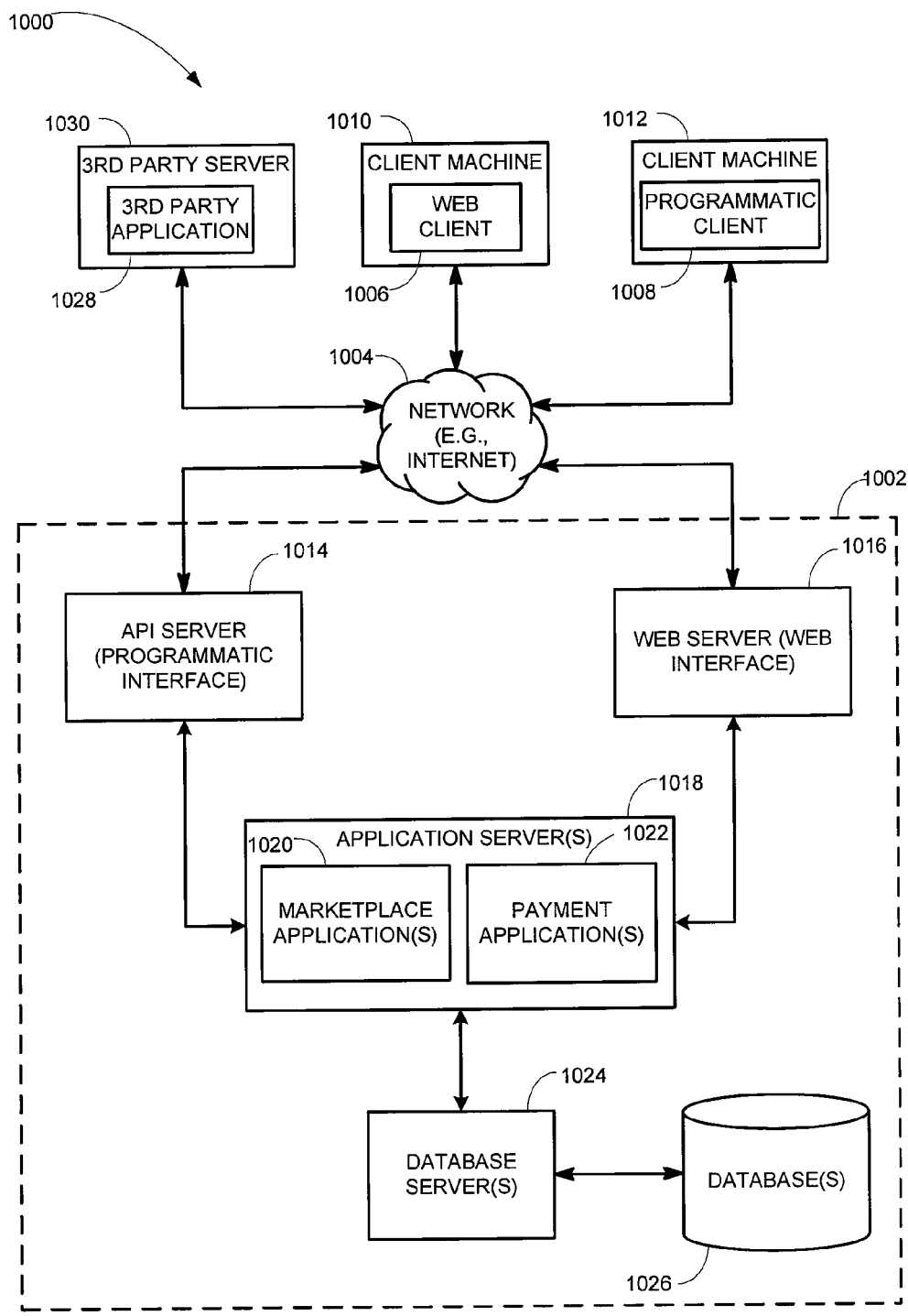
FIG. 10 is a network diagram depicting a network system, according to one embodiment, having a client server architecture configured for exchanging data over a network.

FIG. 10 is a network diagram depicting a client-server system 1000, within which one example embodiment may be deployed. By way of example, a network 1004 may include the functionality of the network 104, the applications 102 which may be deployed on an application server 1018, or may be deployed on a client machine 1010 or a client machine 1012 or a client machine 1030. The central controller 106 may be deployed within an application server 1018. The system 100 may also be deployed in other systems.

A networked system 1002, in the example forms of a network-based marketplace or publication system, provides server-side functionality, via a network 1004 (e.g., the Internet or Wide Area Network (WAN)) to one or more clients. FIG. 10 illustrates, for example, a web client 1006 (e.g., a browser, such as the Internet Explorer browser developed by Microsoft Corporation of Redmond, Washington State), and a programmatic client 1008 executing on respective client machines 1010 and 1012.

An Application Program Interface (API) server 1014 and a web server 1016 are coupled to, and provide programmatic and web interfaces respectively to, one or more application servers 1018. The application servers 1018 host one or more marketplace applications 1020 and authentication providers 1022. The application servers 1018 are, in turn, shown to be coupled to one or more databases servers 1024 that facilitate access to one or more databases 1026.

The marketplace applications 1020 may provide a number of marketplace functions and services to users that access the networked system 1002. The authentication providers 1022 may likewise provide a number of payment services and functions to users. The authentication providers 1022 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1020. While the marketplace and authentication providers 1020 and 1022 are shown in FIG. 10 to both form part of the networked system 1002, in alternative embodiments the authentication providers 1022 may form part of a payment service that is separate and distinct from the networked system 1002.

Further, while the system 1000 shown in FIG. 10 employs a client-server architecture, the present invention is of course not limited to such an architecture, and could equally well find application in a distributed, or peer-to-peer, architecture system, for example. The various marketplace and authentication providers 1020 and 1022 could also be implemented as standalone software programs, which need not have networking capabilities.

The web client 1006 accesses the various marketplace and authentication providers 1020 and 1022 via the web interface supported by the web server 1016. Similarly, the programmatic client 1008 accesses the various services and functions provided by the marketplace and authentication providers 1020 and 1022 via the programmatic interface provided by the API server 1014. The programmatic client 1008 may, for example, be a seller application (e.g., the TurboLister™ application developed by eBay Inc., of San Jose, Calif.) to enable sellers to author and manage listings on the networked system 1002 in an off-line manner, and to perform batch-mode communications between the programmatic client 1008 and the networked system 1002.

FIG. 10 also illustrates a third party application 1028, executing on a third party server machine 1030, as having programmatic access to the networked system 1002 via the programmatic interface provided by the API server 1014. For example, the third party application 1028 may, utilizing information retrieved from the networked system 1002, support one or more features or functions on a website hosted by the third party. The third party may, for example, provide one or more promotional, marketplace or payment functions that are supported by the relevant applications of the networked system 1002.

Figure 11:
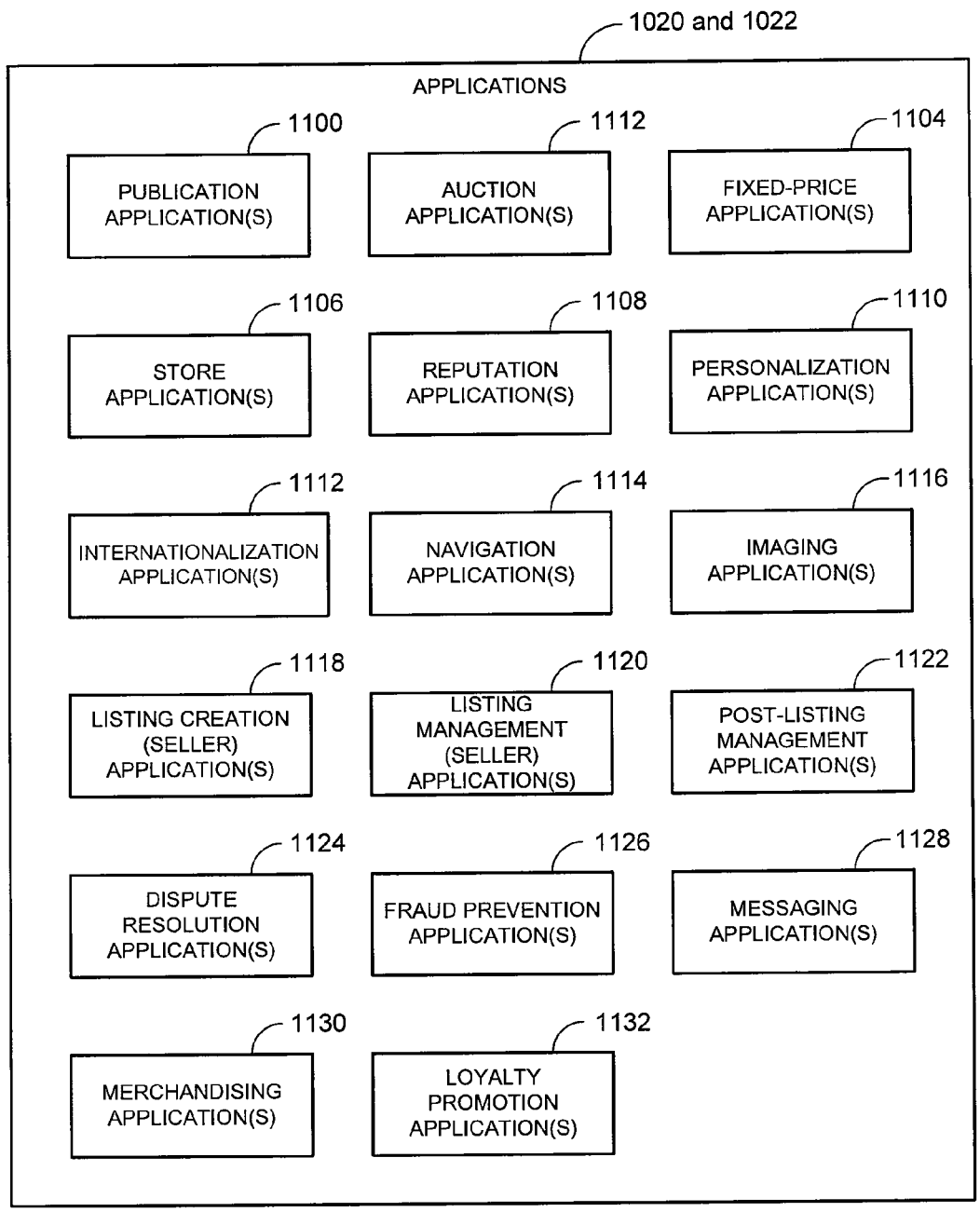
FIG. 11 is a block diagram illustrating an example embodiment of multiple network and marketplace applications, which are provided as part of the network-based marketplace.

FIG. 11 is a block diagram illustrating multiple applications 1020 and 1022 that, in one example embodiment, are provided as part of the networked system 1002 (see FIG. 10). The applications 1020 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1026 via the database servers 1024.

The networked system 1002 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1020 are shown to include at least one publication application 1100 and one or more auction applications 1102 which support auction-format listing and price setting mechanisms (e.g., English, Dutch, Vickrey, Chinese, Double, Reverse auctions etc.). The various auction applications 1102 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1104 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1106 allow a seller to group listings within a "virtual" store, which may be branded and otherwise personalized by and for the seller. Such a virtual store may also offer promotions, incentives and features that are specific and personalized to a relevant seller.

Reputation applications 1108 allow users that transact, utilizing the networked system 1002, to establish, build and maintain reputations, which may be made available and published to potential trading partners. Consider that where, for example, the networked system 1002 supports person-to-person trading, users may otherwise have no history or other reference information whereby the trustworthiness and credibility of potential trading partners may be assessed. The reputation applications 1108 allow a user, for example through feedback provided by other transaction partners, to establish a reputation within the networked system 1002 over time. Other potential trading partners may then reference such a reputation for the purposes of assessing credibility and trustworthiness.

Personalization applications 1110 allow users of the networked system 1002 to personalize various aspects of their interactions with the networked system 1002. For example a user may, utilizing an appropriate personalization application 1110, create a personalized reference page at which information regarding transactions to which the user is (or has been) a party may be viewed. Further, a personalization application 1110 may enable a user to personalize listings and other aspects of their interactions with the networked system 1002 and other parties.

The networked system 1002 may support a number of marketplaces that are customized, for example, for specific geographic regions. A version of the networked system 1002 may be customized for the United Kingdom, whereas another version of the networked system 1002 may be customized for the United States. Each of these versions may operate as an independent marketplace, or may be customized (or internationalized and/or localized) presentations of a common underlying marketplace. The networked system 1002 may accordingly include a number of internationalization applications 1112 that customize information (and/or the presentation of information) by the networked system 1002 according to predetermined criteria (e.g., geographic, demographic or marketplace criteria). For example, the internationalization applications 1112 may be used to support the customization of information for a number of regional websites that are operated by the networked system 1002 and that are accessible via respective web servers 1016.

Navigation of the networked system 1002 may be facilitated by one or more navigation applications 1114. For example, a search application (as an example of a navigation application) may enable key word searches of listings published via the networked system 1002. A browse application may allow users to browse various category, catalogue, or system inventory structures according to which listings may be classified within the networked system 1002. Various other navigation applications may be provided to supplement the search and browsing applications.

In order to make listings available via the networked system 1002 as visually informing and attractive as possible, the marketplace applications 1020 may include one or more imaging applications 1116 utilizing which users may upload images for inclusion within listings. An imaging application 1116 also operates to incorporate images within viewed listings. The imaging applications 1116 may also support one or more promotional features, such as image galleries that are presented to potential buyers. For example, sellers may pay an additional fee to have an image included within a gallery of images for promoted items.

Listing creation applications 1118 allow sellers conveniently to author listings pertaining to goods or services that they wish to transact via the networked system 1002, and listing management applications 1120 allow sellers to manage such listings. Specifically, where a particular seller has authored and/or published a large number of listings, the management of such listings may present a challenge. The listing management applications 1120 provide a number of features (e.g., auto-relisting, inventory level monitors, etc.) to assist the seller in managing such listings. One or more post-listing management applications 1122 also assist sellers with a number of activities that typically occur post-listing. For example, upon completion of an auction facilitated by one or more auction applications 1002, a seller may wish to leave feedback regarding a particular buyer. To this end, a post-listing management application 1122 may provide an interface to one or more reputation applications 1108, so as to allow the seller conveniently to provide feedback regarding multiple buyers to the reputation applications 1108.

Dispute resolution applications 1114 provide mechanisms whereby disputes arising between transacting parties may be resolved. For example, the dispute resolution applications 1114 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1126 implement fraud detection and prevention mechanisms to reduce the occurrence of fraud within the networked system 1002.

Messaging applications 1128 are responsible for the generation and delivery of messages to users of the networked system 1002, such messages for example advising users regarding the status of listings at the networked system 1002 (e.g., providing "outbid" notices to bidders during an auction process or to provide promotional and merchandising information to users). Respective messaging applications 1128 may utilize any one have a number of message delivery networks and platforms to deliver messages to users. For example, messaging applications 1128 may deliver electronic mail (e-mail), instant message (IM), Short Message Service (SMS), text, facsimile, or voice (e.g., Voice over IP (VoIP))

messages via the wired (e.g., the Internet), Plain Old Telephone Service (POTS), or wireless (e.g., mobile, cellular, WiFi, WiMAX) networks.

Merchandising applications 1130 support various merchandising functions that are made available to sellers to enable sellers to increase sales via the networked system 1002. The merchandising applications 1130 also operate the various merchandising features that may be invoked by sellers, and may monitor and track the success of merchandising strategies employed by sellers.

The networked system 1002 itself, or one or more parties that transact via the networked system 1002, may operate loyalty programs that are supported by one or more loyalty/promotions applications 1132. For example, a buyer may earn loyalty or promotions points for each transaction established and/or concluded with a particular seller, and may be offered a reward for which accumulated loyalty points can be redeemed.

Figure 12:
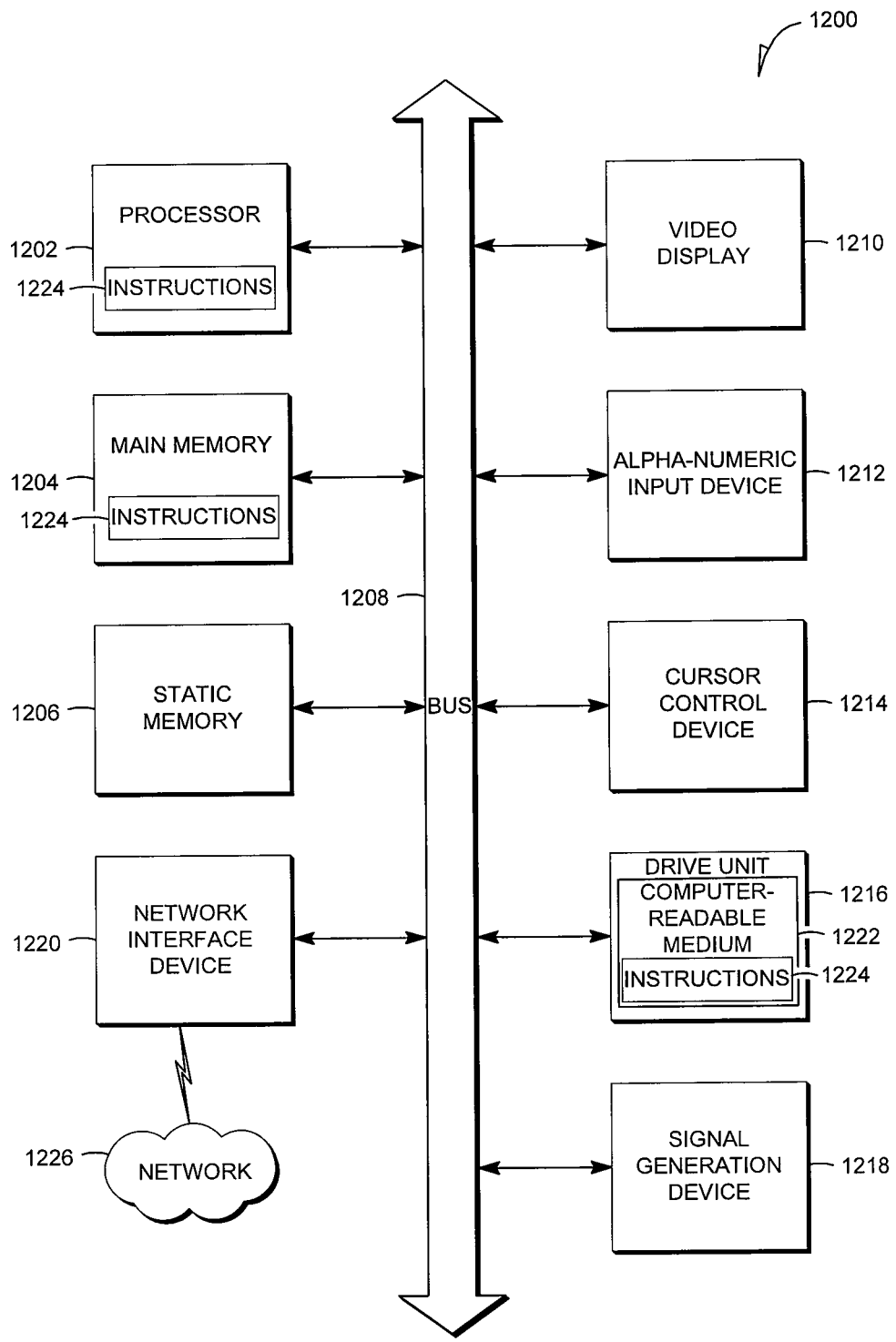
FIG. 12 is a block diagram diagrammatic representation of machine in the example form of a computer system within which a set of instructions for causing the machine to perform any one or more of the methodologies discussed herein may be executed.

FIG. 12 shows a diagrammatic representation of machine in the example form of a computer system 1200 within which a set of instructions may be executed causing the machine to perform any one or more of the methods, processes, operations, or methodologies discussed herein. The provider 106 and/or the applications 102 (see FIG. 1) may operate on or more computer systems 1200.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU) a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a cursor control device 1214 (e.g., a mouse), a drive unit 1216, a signal generation device 1218 (e.g., a speaker) and a network interface device 1220.

The drive unit 1216 includes a machine-readable medium 1222 on which is stored one or more sets of instructions (e.g., software 1224) embodying any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for managing resource connections have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving an initial user request to access data stored at a resource, the initial user request generated by an application of a plurality of applications having access to the resource;
utilizing an existing connection from the application to provide the data to the application;
receiving a current user request to access data stored at the resource;
based on a determination that the existing connection is unavailable, assigning the current user request to a waiter queue;
determining that a number of requests assigned to the waiter queue during a pre-defined time period exceeds a threshold; and
creating a new connection from the application to the resource based on availability of a further connection to the resource and exceeding the threshold to control a rate at which new connections are created.

2. The method of claim 1, further comprising receiving a number of initial user requests and creating a number of initial connections based on the initial user requests.

3. The method of claim 1, further comprising determining that a number of waiter time-outs exceeds a waiter timeout threshold.

4. The method of claim 1, further comprising:
receiving an additional user request generated by the application;
determining the availability of the created connection; and
based on the availability of the existing connection, utilizing the created connection to process the additional user request.

5. The method of claim 1, further comprising:
receiving an additional user request generated by the application;
determining the availability of the created connection;
making a call to a connection rate authority;
creating a further connection from the application to the resource based on the availability of the created connection and a response from the connection rate authority.

6. The method of claim 5, wherein the response of the connection rate control authority is based on a throttle delay used to repeat a distributed pattern associated with a stagger delay during a connection storm to keep user requests evenly distributed.

7. The method of claim 6, wherein the throttle delay is based on a determination to throttle based on a last new connection creation date.

8. The method of claim 5, wherein the response of the connection rate control authority is based on receiving a number of different application control rate process requests associated with the resource.

9. The method of claim 8, further comprising determining whether a global stagger delay has been met and setting a new global stagger delay.

10. The method of claim 1, wherein the resource stores transaction data and user data.

11. The method of claim 1, wherein the user requests are received serially or simultaneously.

12. The method of claim 1, wherein the user requests are web requests.

13. The method of claim 1, wherein the existing connection is a thread returning a connection.

14. The method of claim 1, wherein the existing connection is a background thread creating a new connection.

15. The method of claim 1, wherein the existing connection is from putting the new connection in a connection pool and then utilizing the connection from the connection pool.

16. The method of claim 1, wherein the availability of the connection is determined from a connection pool of potentially available connections.

17. A system comprising:
a resource storing data accessible by a plurality of applications;
a network;
a processor communicatively coupled to the resource through the network; and
a connection rate control processing subsystem, executable by the processor, configured to receive an initial user request to access data stored at a resource, the initial user request generated by an application of the plurality of applications having access to the resource; utilize an existing connection from the application to provide the data to the application;
receive a current user request to access data at the resource and determine the existing connection is unavailable, assign the current user request to a waiter queue;
and determine that a number of requests assigned to the waiter queue during a pre-defined time period exceeds a threshold.

18. The system of claim 17, wherein the resource stores transaction data and user data.

19. A non-transitory machine-readable storage medium having instructions embodied thereon, the instructions executable by one or more processors for performing a method comprising:
receiving an initial user request to access data stored at a resource, the initial user request generated by an application of a plurality of applications having access to the resource;
utilizing an existing connection from the application to provide the data to the application;
receiving a current user request to access data stored at the resource;
based on a determination that the existing connection is unavailable, assigning the current user request to a waiter queue;
determining that a number of requests assigned to the waiter queue during a pre-defined time period exceed a threshold; and
creating a new connection from the application to the resource based on the availability of a further connection to the resource and exceeding the threshold to control a rate at which new connections are created.

20. The non-transitory machine-readable storage medium of claim 19, wherein the resource stores transaction data and user data.

* * * * *